(12) United States Patent
Barton

(10) Patent No.: X8091
(45) Date of Patent: Mar. 18, 1834

(54) BELLS FOR HORSES

(76) Inventor: Jason Barton

Jason Barton of Cairo New York.
Letters Patent

The Schedule referred to in these Letters Patent and making part of the same containing a description in the words of the said Jason Barton himself of his improvement in the mode of constructing and combining Bells for horses and for other purposes, To all whom it may concern. Be it known that I, Jason Barton, of Cairo in the County of Greene and State of New York have invented an improvement in the mode of constructing and combining Bells in such a way, that two four, or any greater number may be struck by a single tongue, clapper or hammer at the same time; which combined bells are intended to be attached to the arms or other parts of harness for horses; and which may be also advantageously used in military and other Bands of music in the place of tri. angles and other instruments which are employed for a similar purpose: And I do hereby declare that the following is a full and exact description of my said invention.

Although more than four Bells may be combined together upon my plan. I will for the sake of facility in description, suppose that to be the number employed I cast two bells of any suitable metal, or mixture of metals each of which bells is to be hemispherical, or in such form that when their edges are made to approach each other within half an inch their outline will be a sphere, say of four inches in diameter these bells are to have holes in their centres like ordinary clock bells for the purpose of attaching them together. This, it is evident might be done by a straight rod of metal, with screws and nuts; but instead of this I make a ring or hoop somewhat less in diameter than the inside of the bells. and from the periphery of this on opposite sides project two spurs or pins which pass through the holes in the bells. and are attached to them by nuts,
I then take two other bells of a larger size. say of five inches in diameter, and in the same hemispherical form These are to surround the others, and are attached to the same ring: for this purpose, two other spurs, or pins project from the ring midway between those first named, and passing through the space between the first pair of bells, serve by screws and nuts to secure the outer pair concentric with them. A pin or piece of metal projects from the interior of each of the bells, pointing towards their centres for the hammer to strike against. Those on the two outer bells, passing through the space left between the inner ones and those on the inner bells, are as close as may be to them, so that they all terminate near enough to each other; and are of such length that they will receive the blow at the same time. These pins may be cast of the same metal with the bells. or pins of hard iron or steel tinned and laid in the mould, may be used, should it be found that the others have a tendency to batter up.

The tongue clapper or hammer, which is to strike these pins, stands in the middle of the hoop or ring, within the inner bells, where it is hung by means of a spiral coil of steel or iron wire, attached by one end to the ring, and by the other to the hammer, which may be in the form of a flat disk of metal. of such thickness as will give it sufficient weight. When so fixed, a slight agitation will bring it into contact with the four projecting pins upon the peripheries of the bells. the outer bells may approach each other very nearly, say within one fourth of an inch, and the whole may be of any size desired.

The two spurs or pins, by which the outer bells are fastened serve also to receive the bale or ring, which is to serve as a support for the apparatus and by which it is to be attached to the arms or wherever else it is intended to be used – What I claim as my invention is the combining together, any convenient number of hemispherical bells, concentrically, and placing within them a single hammer or clapper which may strike the whole at once, whether the same be arranged precisely in the manner here described or in any

[illegible] other in which the same principle obtains and a similar effect is produced

[illegible] Witnesses { Thos. P. Jones, Jos. Andrews } Jason Barton (Patented 18th March 1834) (868 words)